(12) United States Patent
Calderon

(10) Patent No.: US 10,596,861 B1
(45) Date of Patent: Mar. 24, 2020

(54) PUNCTURE RESISTANT LINER ASSEMBLY

(71) Applicant: Mario Calderon, Midland, TX (US)

(72) Inventor: Mario Calderon, Midland, TX (US)

( * ) Notice: Subject to any disclaimer, the term of this patent is extended or adjusted under 35 U.S.C. 154(b) by 0 days.

(21) Appl. No.: 16/443,403

(22) Filed: Jun. 17, 2019

(51) Int. Cl.
*B60C 19/12* (2006.01)
*B60C 5/20* (2006.01)

(52) U.S. Cl.
CPC .............. *B60C 19/122* (2013.01); *B60C 5/20* (2013.01)

(58) Field of Classification Search
CPC .... B60C 5/02; B60C 5/20; B60C 5/22; B60C 5/24; B60C 19/00; B60C 19/12; B60C 19/122; B60C 19/127
See application file for complete search history.

(56) References Cited

U.S. PATENT DOCUMENTS

| 600,828 | A | * | 3/1898 | Carter | .................. B60C 7/12 152/165 |
|---|---|---|---|---|---|
| 2,506,861 | A | | 5/1950 | Drennan | |
| 4,945,965 | A | | 8/1990 | Kim | |
| 2003/0019553 | A1 | | 1/2003 | Yun et al. | |

FOREIGN PATENT DOCUMENTS

| FR | 2209676 | * | 8/1974 |
|---|---|---|---|
| RU | 2093367 | * | 10/1997 |

* cited by examiner

*Primary Examiner* — Justin R Fischer
(74) *Attorney, Agent, or Firm* — Dale J. Ream

(57) ABSTRACT

A puncture resistant liner assembly for use with a tire having a tread layer and opposed inside and outside walls extending away from the tread layer so as to define an interior tire space includes a primary protection layer that includes a plurality of primary pockets each having an outer wall defining a primary interior area and having a primary air capsule situated in the primary interior area. An auxiliary protection layer includes a plurality of auxiliary pockets each having a continuous outer wall defining an auxiliary interior area and having an auxiliary air capsule situated in the auxiliary interior area. Similarly, the liner assembly includes inner and outer protection layers adjacent and operably coupled to an inside and outside ends of the primary protection layer and that include a plurality of inner and outer pockets, respectively, each having a continuous outer wall defining an inner and outer interior areas.

17 Claims, 4 Drawing Sheets

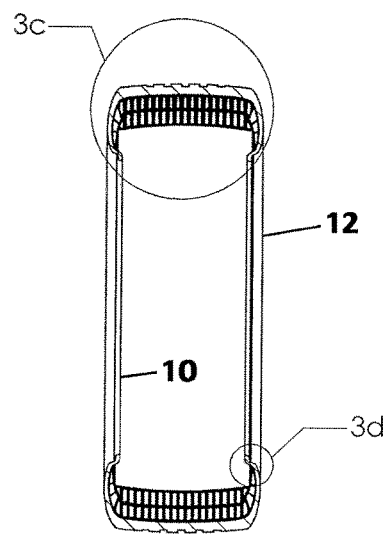
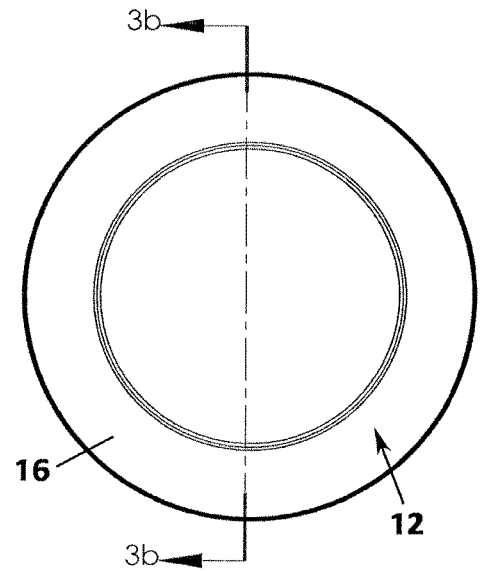
Fig.3b
Fig.3a
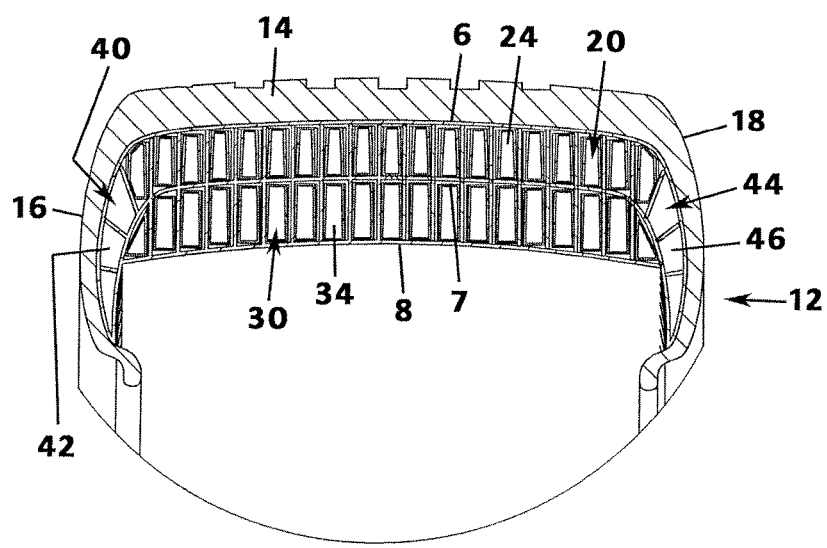
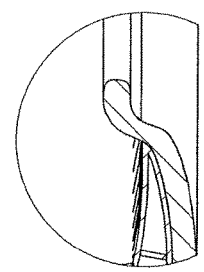
Fig.3c
Fig.3d

PUNCTURE RESISTANT LINER ASSEMBLY

BACKGROUND OF THE INVENTION

This invention relates generally to tires and inner tubes and, more particularly, a puncture resistant line assembly for insertion into a tire which absorbs a puncture to the tire and prevents the tire from going flat.

A tire on an automobile, motorcycle, or other vehicle may be punctured by running over a nail, bolt, screw, or other sharp object such that the tire loses air and, eventually, goes flat and the vehicle is immobilized until the tire is changed. The speed with which the tire loses air, of course, depends on the severity of the puncture and speed at which air is being lost from the interior space of the tire and so there is usually a judgment call by the driver if he can make it to a repair shop before the tire is flat and the vehicle is no longer drivable. Continuing to drive with a flat tire, of course, risks ruining the tire altogether.

Various products and patents have proposed solutions to the problem of getting a flat tire due to a puncture. Although presumably effective for their intended purposes, there is still a need for a more effective solution to the problems discussed above. Therefore, it would be desirable to have a puncture resistant liner that would resist or eliminate a tire from losing air and going flat as a result of being punctured. Further, it would be desirable to have a puncture resistant liner having protective layers adjacent a tread surface and side walls of a tire. In addition, would be desirable to have a puncture resistant liner having a plurality of air pockets for receiving a puncture so that the main reservoir of a tire is not released by a puncture.

SUMMARY OF THE INVENTION

A puncture resistant liner assembly according to the present invention for use with a tire having a tread layer and opposed inside and outside walls extending away from the tread layer so as to define an interior tire space includes a primary protection layer that includes a plurality of primary pockets each having a continuous outer wall defining a primary interior area and having a primary air capsule situated in the primary interior area. Further, an auxiliary protection layer includes a plurality of auxiliary pockets each having a continuous outer wall defining an auxiliary interior area and having an auxiliary air capsule situated in the auxiliary interior area.

Similarly, the invention includes an inner protection layer adjacent and operably coupled to an inside end of the primary protection layer and that includes a plurality of inner pockets each having a continuous outer wall defining an inner interior area and having an inner air capsule situated in the inner interior area. Similarly, an outer protection layer is adjacent and operably coupled to an outer end of the primary protection layer and that includes a plurality of outer pockets each having a continuous outer wall defining an outer interior area and having an outer air capsule situated in the outer interior area.

Therefore, a general object of this invention is to provide a puncture resistant liner assembly that, when mounted in a tire, allows the tire to be driven on even after being punctured.

Another object of this invention is to provide a puncture resistant liner assembly, as aforesaid, that includes a plurality of pockets each having an air capsule configured to receive a puncture and only releasing air within the pocket.

Still another object of this invention is to provide a puncture resistant liner assembly, as aforesaid, that includes a plurality of primary and auxiliary pockets adjacent the tread layer of a tire as well as inner and outer pockets adjacent side walls of the tire.

Yet another object of this invention is to provide a puncture resistant liner assembly, as aforesaid, that may be integrally constructed in a tire or may be inserted into an existing tire.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a sectional view taken along line 2b-2b of FIG. 2a;

FIG. 3a is a side view of the liner assembly mounted in a tire according to the present invention;

FIG. 3b is a sectional view taken along line 3b-3b of FIG. 3a;

FIG. 3c is an isolated view on an enlarged scale taken from FIG. 3b;

FIG. 3d is an isolated view on an enlarged scale taken from FIG. 3b;

FIG. 4b is a sectional view taken along line 4b-4b as in FIG. 4a; and

DESCRIPTION OF THE PREFERRED EMBODIMENT

Figure 1:
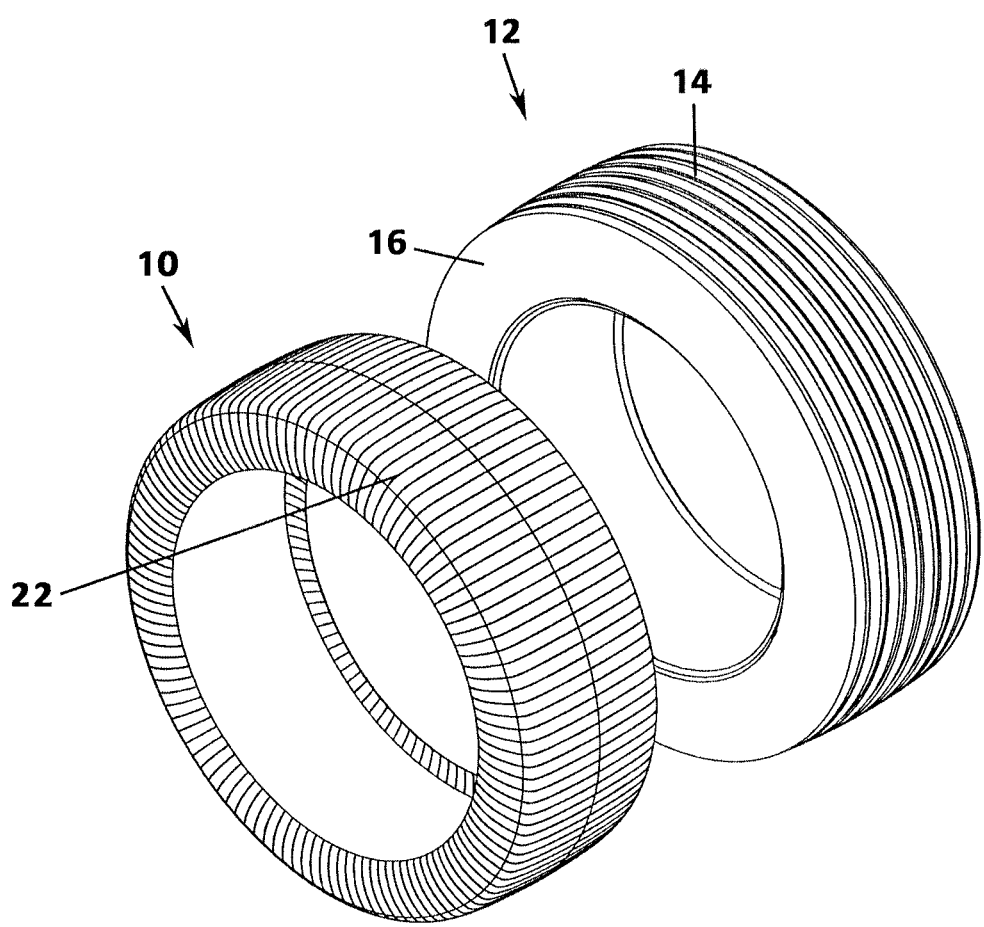
FIG. 1 is an exploded view of puncture resistant liner assembly according to a preferred embodiment of the present invention.
Figure 2B:
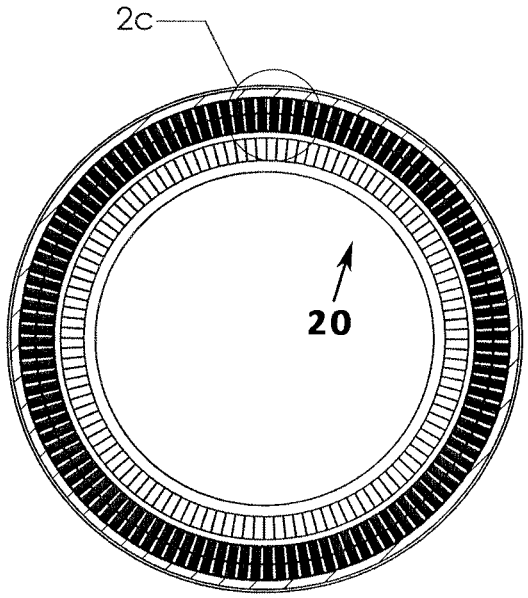
Figure 2A:
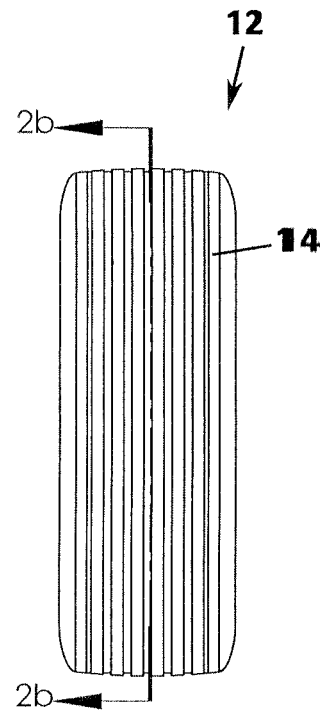
FIG. 2a is an end view of the liner assembly mounted in a tire according to the present invention.
Figure 2C:
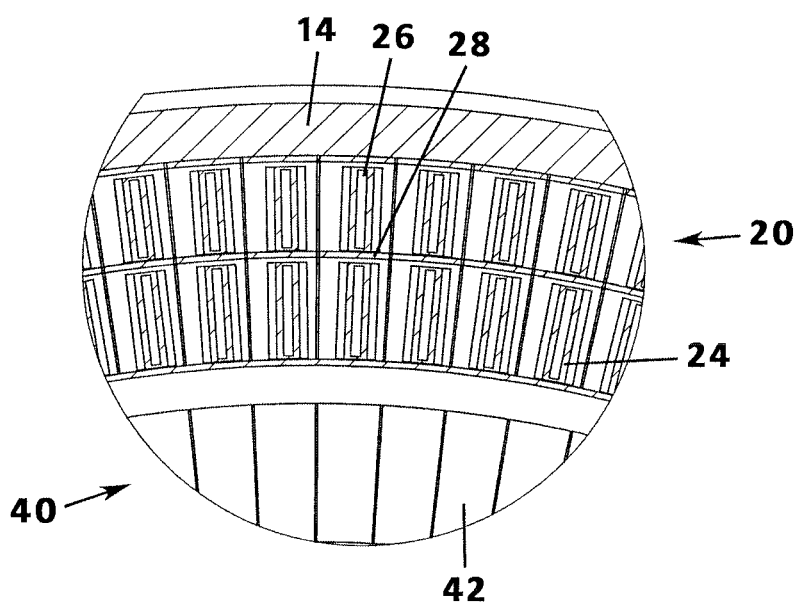
FIG. 2c is an isolated view on an enlarged scale taken from FIG. 2b.

A puncture resistant liner assembly according to a preferred embodiment of the present invention will now be described in detail with reference to FIGS. 1 to 4c of the accompanying drawings. The puncture resistant liner assembly 10 includes a primary protection layer 20, an auxiliary protection layer 30, an inner protection layer 40, and an outer protection layer 44 that work together to enable a punctured tire to continue and not go flat. The puncture resistant liner assembly 10 is intended for use with a standard automobile tire 12 having a tread layer 14 and an inside wall 16, and an outside wall 18 extending away from the tread layer 14 and that, collectively, define an interior tire space into which the liner assembly 10 may be inserted either at a point of manufacture or aftermarket.

The puncture resistant liner assembly 10 may include an outermost wall 6, an innermost wall 8, and an intermediate wall 7 situated between the outermost and innermost walls, each wall being displaced from an adjacent wall. The primary and auxiliary protection layers are situated in the spaces between these walls as will be described below. It is understood that the walls of the liner assembly 10 may be constructed of rubber or other flexible yet durable material. In an embodiment, the outermost wall 6 of the liner assembly 10 may be fixedly attached to an inner surface of the tire 12, such as with glue or other fasteners.

The primary protection layer 20 is arranged to extend for 360 degrees in a continuous construction (FIG. 1). Accordingly, the primary protection layer 20 may include a plurality of primary blocks 22 each extending laterally (such as between side walls of a tire) and having lateral side edges coupled to adjacent lateral side edges of adjacent primary blocks such that the primary protection layer extends continuously. Each primary block 22 includes a plurality of primary pockets 24 coupled to one another and situated in the space between the outermost wall 6 and the intermediate wall 7 (FIG. 3c). Each primary pocket 24 includes a continuous outer wall defining a primary interior area and having a primary air capsule situated in the primary interior area. It is understood that each air capsule may include a plastic wall and be filled with air and sealed (at least until punctured).

Similarly, the auxiliary protection layer 30 is arranged to extend for 360 degrees in a continuous construction (FIG. 1). Accordingly, the auxiliary protection layer 30 may include a plurality of auxiliary blocks each extending laterally (such as between side walls of a tire) and having lateral side edges coupled to adjacent lateral side edges of adjacent auxiliary blocks such that the auxiliary protection layer extends continuously as a layer. Each auxiliary block includes a plurality of auxiliary pockets 34 coupled to one another and situated in the space between the intermediate wall 7 and the innermost wall 8 (Fig.). Each auxiliary pocket 34 includes a continuous outer wall defining a primary interior area and having a auxiliary air capsule situated in the auxiliary interior area. It is understood that each air capsule may include a plastic wall or housing and may be filled with air and sealed (at least until punctured).

Figure 4B:
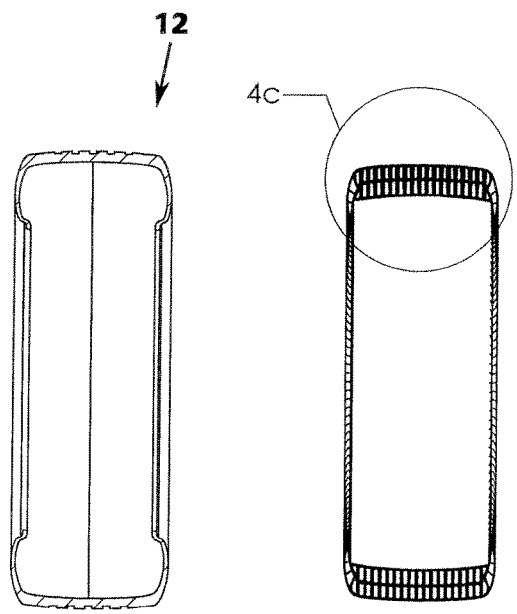
Figure 4A:
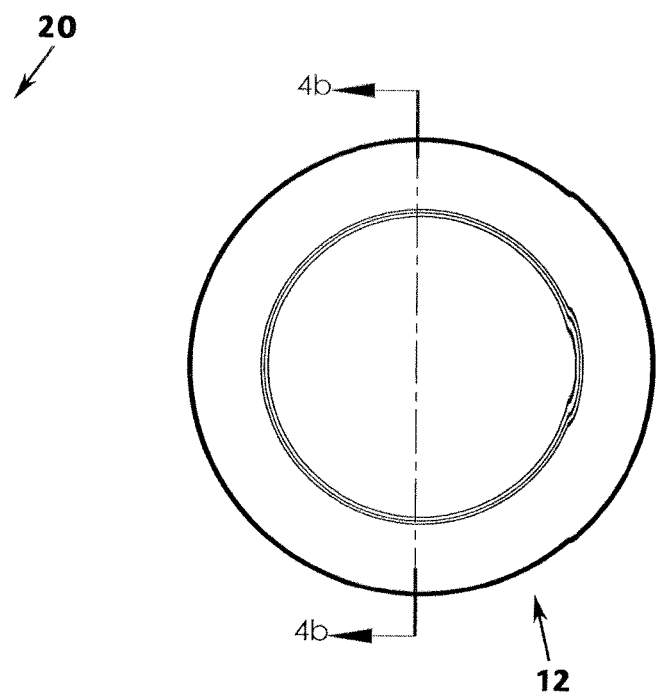
FIG. 4a is a side view of the liner assembly removed from the tire as in FIG. 1.
Figure 4C:
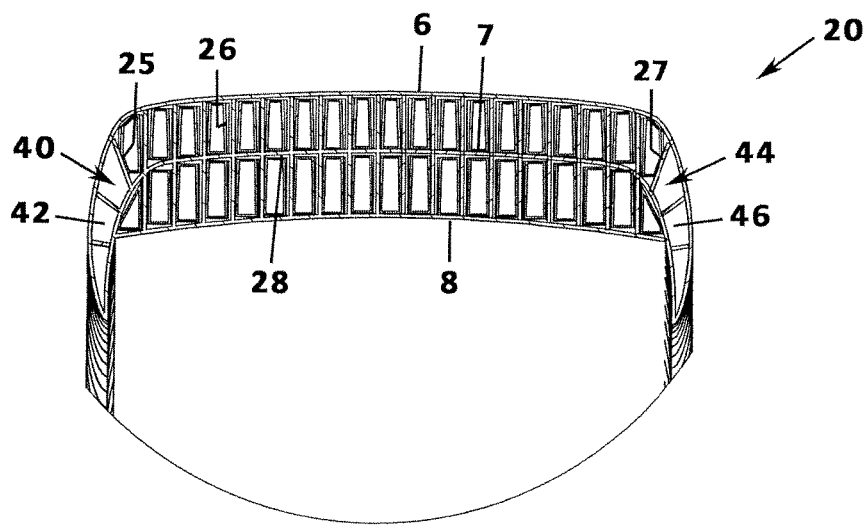
FIG. 4c is an isolated view on an enlarged scale taken from FIG. 3b.

For additional clarity and understanding how to manufacture the present invention, it can be seen that each primary pocket 24 may include a respective upper end 26 adjacent the tread layer 14 of the tire 12 (when the liner assembly 10 is inserted therein (FIG. 3c)) and has a respective lower end 28 opposite a respective upper end 26. Similarly, each auxiliary pocket 34 includes an upper end coupled to (or positioned immediately adjacent) a respective lower end 28 of a respective primary pocket 24 and has a respective lower end. In other words, the pockets of the plurality of auxiliary pockets are associated with pockets of the plurality of primary pockets on a one-to-one basis as shown in FIG. 4c.

It is understood that with a plurality of primary blocks 22 and each primary block 22 having a plurality of primary pockets 24, the number of primary pockets is exponentially large and each primary pocket is very small such that a puncture (e.g. by running over a nail) is very self-contained and loss of air is minimal. And, further, it is understood that the auxiliary protection layer 30 is secondary to the primary layer of air pockets and provides a secondary exponential quantity of air pockets with which to receive a puncture while losing only a small quantity of air. However, having the auxiliary protection layer 30 is critical and not a mere design choice as many punctures experienced by a tread layer 14 are deep and there is a need for a secondary layer of puncture protection.

FIG. 3c illustrates the geometry of the primary and auxiliary protection layers when the liner assembly 10 is inserted or mounted in the interior tire space of a tire 12. More particularly, the plurality of primary pockets 24 extend axially between the inside wall 16 and outside wall 18 of the tire 12, are positioned laterally adjacent one another, and are immediately adjacent an inner surface of the tread layer 14 of the tire. In other words, the plurality of primary pockets 24 are arranged in a generally linear configuration. In fact, the outermost wall 6 of the liner assembly 10 may be glued or otherwise coupled to an inner surface of the tread layer 14 of the tire 12 and is the only material separating the primary protection layer 20 from the tire. Similarly, FIG. 3c also illustrates that the plurality of auxiliary pockets 34 extend axially between the inside wall 16 and outside wall 18 of the tire 12 and are immediately adjacent associated primary pockets 24.

In other aspects, the puncture resistant liner assembly 10 also includes an inner protection layer 40 and an outer protection layer 44 for providing puncture protection to the sides of a tire 12, respectively. First, the primary protection layer 20 of each primary block 22 includes an inside end 25 and an outside end 27 opposite one another. The inner protection layer 40 is operably coupled to the inside end 25 and the outer protection layer 44 is operably coupled to the outside end 27. More particularly, the inner protection layer 40 includes a plurality of inner pockets 42 each having a continuous outer wall defining what will be referred to as an inner interior area and having an inner air capsule positioned in the inner interior area, the air capsule having a construction substantially similar to that described above. In use, each inner protection layer 40 is positioned adjacent the inside wall 16 of the tire and, accordingly, keeps the tire 12 from going flat if punctured through the inside wall thereof.

Similarly, the outer protection layer 44 includes a plurality of outer pockets 46 each having a continuous outer wall defining what will be referred to as an outer interior area and having an outer air capsule positioned in the outer interior area, the air capsule having a construction substantially similar to that described above. In use, each outer protection layer 44 is positioned adjacent the outside wall 18 of the tire and, accordingly, keeps the tire 12 from going flat if punctured through the outside wall thereof.

As shown specifically in the cross-sectional view of FIG. 3c, each of the inner protection layer 40 and outer protection layer 44 may have a curved or gently arcuate shape configuration that is complementary to the natural outward curvature of the inside wall 16 and outside wall 18, respectively, of the tire 12. This particular shape configuration enhances the liner assembly 10 fitting snuggly in a tire 12.

Finally, the liner assembly 10 may be coupled to an edge of the tire 12, such as with glue, as is shown in FIG. 3d and as would be known in the art regarding securing a liner or inner tube within a tire.

In use, the puncture resistant liner assembly 10 may be inserted and installed in a tire 12. With the liner assembly in place, driving over a nail, bolt, metal fragment, or the like, may result in a puncture to the tread layer 14 or even a side wall of the tire 12 and then into one of the protective layers described above. Only air from the punctured pocket is released and not from the interior tire space; thus, the tire 12 does not go flat.

It is understood that while certain forms of this invention have been illustrated and described, it is not limited thereto except insofar as such limitations are included in the following claims and allowable functional equivalents thereof.

The invention claimed is:
1. A puncture resistant liner assembly for preventing a tire from going flat if punctured for use with a tire having a tread layer and opposed inside and outside walls extending away from the tread layer so as to define an interior tire space, said puncture resistant liner assembly, comprising:

a primary protection layer that includes a plurality of primary pockets each having a continuous outer wall defining a primary interior area and having a primary air capsule situated in said primary interior area;

wherein said each primary pocket includes a primary upper end and an opposed primary lower end;

an auxiliary protection layer that includes a plurality of auxiliary pockets each having a continuous outer wall defining an auxiliary interior area and having an auxiliary air capsule situated in said auxiliary interior area;

wherein said each auxiliary pocket includes an auxiliary upper end coupled to an associated primary lower end and an auxiliary lower end opposite said auxiliary upper end;

an outermost wall;

an intermediate wall, said primary protection layer being positioned in a space defined between said outermost wall and said intermediate wall;

an innermost wall, said auxiliary protection layer being positioned in a space defined between said intermediate wall and said innermost wall.

2. The puncture resistant liner assembly as in claim 1, wherein:

said plurality of primary pockets is axially adjacent the tread layer and extend between the inside and outside walls of the tire when said primary protection layer is removably positioned in the interior tire space;

said auxiliary protection layer is displaced from the tread layer when said primary protection layer is removably positioned in the interior tire space.

3. The puncture resistant liner assembly as in claim 1 wherein said outermost wall is fixedly attached to an inner surface of the tire.

4. The puncture resistant liner assembly as in claim 1, wherein:

each primary air capsule is constructed of plastic and is filled with ambient air; and each auxiliary air capsule is constructed of plastic and is filled with ambient air.

5. The puncture resistant liner assembly as in claim 1, wherein:

said primary protection layer includes a plurality of primary protection blocks arranged in a 360 degree continuous layer, each said primary protection block extending laterally and having a lateral side coupled to an associated lateral side of an adjacent primary protection block;

wherein said plurality of primary pockets are situated in each said primary protection block, respectively;

said auxiliary protection layer includes a plurality of auxiliary protection blocks arranged in a 360 degree continuous layer, each said auxiliary protection block extending laterally and having a lateral side coupled to an associated lateral side of an adjacent auxiliary protection block;

wherein said plurality of auxiliary pockets are situated in each said primary protection block, respectively.

6. A puncture resistant liner assembly for preventing a tire from going flat if punctured for use with a tire having a tread layer and opposed inside and outside walls extending away from the tread layer so as to define an interior tire space, said puncture resistant liner assembly, comprising:

a primary protection layer that includes a plurality of primary pockets each having a continuous outer wall defining a primary interior area and having a primary air capsule situated in said primary interior area;

wherein said each primary pocket includes a primary upper end and an opposed primary lower end;

an auxiliary protection layer that includes a plurality of auxiliary pockets each having a continuous outer wall defining an auxiliary interior area and having an auxiliary air capsule situated in said auxiliary interior area;

wherein said each auxiliary pocket includes an auxiliary upper end coupled to an associated primary lower end and an auxiliary lower end opposite said auxiliary upper end;

an inner protection layer adjacent and operably coupled to an inside end of said primary protection layer and that includes a plurality of inner pockets each having a continuous outer wall defining an inner interior area and having an inner air capsule situated in said inner interior area;

wherein said inner protection layer is situated adjacent the inside wall of the tire when said primary protection layer is removably positioned in the interior tire space.

7. The puncture resistant liner assembly as in claim 6, further comprising:

an outer protection layer adjacent and operably coupled to an outer end of said primary protection layer and that includes a plurality of outer pockets each having a continuous outer wall defining an outer interior area and having an outer air capsule situated in said outer interior area;

wherein said outer protection layer is situated adjacent the outside wall of the tire when said primary protection layer is removably positioned in the interior tire space.

8. The puncture resistant liner assembly as in claim 6, comprising:

an inner protection layer adjacent and operably coupled to an inside end of said primary protection layer and that includes a plurality of inner pockets each having a continuous outer wall defining an inner interior area and having an inner air capsule situated in said inner interior area;

wherein said inner protection layer is situated adjacent the inside wall of the tire when said primary protection layer is removably positioned in the interior tire space;

an outer protection layer adjacent and operably coupled to an outer end of said primary protection layer and that includes a plurality of outer pockets each having a continuous outer wall defining an outer interior area and having an outer air capsule situated in said outer interior area;

wherein said outer protection layer is situated adjacent the outside wall of the tire when said primary protection layer is removably positioned in the interior tire space.

9. The puncture resistant liner assembly as in claim 8, wherein:

a cross-sectional view of said primary protection layer has a linear configuration;

a cross-sectional view of said inner protection layer has an arcuate configuration complementary to a curved configuration of the tire in a region of the tire between the tread layer and the inside wall;

a cross-sectional view of said outer protection layer has an arcuate configuration complementary to a curved configuration of the tire in a region of the tire between the tread layer and the outer wall.

10. A puncture resistant liner assembly for preventing a tire from going flat if punctured, comprising:

a tire having a tread layer and opposed inside and outside walls extending away from the tread layer so as to, together, define an interior tire space;

a primary protection layer having a plurality of primary protection blocks arranged in a 360 degree continuous layer and positioned in said interior tire space, each said primary protection block extending laterally and having a lateral side coupled to an associated lateral side of an adjacent primary protection block;

wherein said each primary protection block includes a plurality of primary pockets each having a continuous outer wall defining a primary interior area and having a primary air capsule situated in said primary interior area;

wherein said each primary pocket includes a primary upper end coupled to an inner surface of said tread layer and an opposed primary lower end;

an auxiliary protection layer having a plurality of auxiliary protection blocks arranged in a 360 degree continuous layer, each said auxiliary protection block extending laterally and having a lateral side coupled to an associated lateral side of an adjacent auxiliary protection block;

wherein said each auxiliary protection block includes a plurality of auxiliary pockets each having a continuous outer wall defining an auxiliary interior area and having an auxiliary air capsule situated in said auxiliary interior area;

wherein said each auxiliary pocket includes an auxiliary upper end coupled to an associated primary lower end and an auxiliary lower end opposite said auxiliary upper end.

11. The puncture resistant liner assembly as in claim 10, further comprising:
an outermost wall;
an intermediate wall, said primary protection layer being positioned in a space defined between said outermost wall and said intermediate wall;
an innermost wall, said auxiliary protection layer being positioned in a space defined between said intermediate wall and said innermost wall.

12. The puncture resistant liner assembly as in claim 11 wherein said outermost wall is fixedly attached to an inner surface of the tire.

13. The puncture resistant liner assembly as in claim 10, further comprising:
an inner protection layer adjacent and operably coupled to an inside end of said primary protection layer and that includes a plurality of inner pockets each having a continuous outer wall defining an inner interior area and having an inner air capsule situated in said inner interior area;
wherein said inner protection layer is situated adjacent the inside wall of the tire when said primary protection layer is removably positioned in the interior tire space.

14. The puncture resistant liner assembly as in claim 10, further comprising:
an outer protection layer adjacent and operably coupled to an outer end of said primary protection layer and that includes a plurality of outer pockets each having a continuous outer wall defining an outer interior area and having an outer air capsule situated in said outer interior area;
wherein said outer protection layer is situated adjacent the outside wall of the tire when said primary protection layer is removably positioned in the interior tire space.

15. The puncture resistant liner assembly as in claim 10, comprising:
an inner protection layer adjacent and operably coupled to an inside end of said primary protection layer and that includes a plurality of inner pockets each having a continuous outer wall defining an inner interior area and having an inner air capsule situated in said inner interior area;
wherein said inner protection layer is situated adjacent the inside wall of the tire when said primary protection layer is removably positioned in the interior tire space;
an outer protection layer adjacent and operably coupled to an outer end of said primary protection layer and that includes a plurality of outer pockets each having a continuous outer wall defining an outer interior area and having an outer air capsule situated in said outer interior area;
wherein said outer protection layer is situated adjacent the outside wall of the tire when said primary protection layer is removably positioned in the interior tire space.

16. The puncture resistant liner assembly as in claim 15, wherein:
a cross-sectional view of said primary protection layer has a linear configuration;
a cross-sectional view of said inner protection layer has an arcuate configuration complementary to a curved configuration of the tire in a region of the tire between the tread layer and the inside wall;
a cross-sectional view of said outer protection layer has an arcuate configuration complementary to a curved configuration of the tire in a region of the tire between the tread layer and the outer wall.

17. The puncture resistant liner assembly as in claim 10, wherein:
each primary air capsule is constructed of plastic and is filled with ambient air; and
each auxiliary air capsule is constructed of plastic and is filled with ambient air.

* * * * *